(12) United States Patent
Gies

(10) Patent No.: US 7,483,037 B2
(45) Date of Patent: Jan. 27, 2009

(54) RESAMPLING CHROMA VIDEO USING A PROGRAMMABLE GRAPHICS PROCESSING UNIT TO PROVIDE IMPROVED COLOR RENDERING

(75) Inventor: Sean Matthew Gies, Campbell, CA (US)

(73) Assignee: Apple, Inc., Cupertino, CA (US)

( * ) Notice: Subject to any disclaimer, the term of this patent is extended or adjusted under 35 U.S.C. 154(b) by 271 days.

(21) Appl. No.: 11/261,240

(22) Filed: Oct. 27, 2005

(65) Prior Publication Data

US 2007/0097142 A1      May 3, 2007

(51) Int. Cl.
| | |
|---|---|
| G09G 3/36 | (2006.01) |
| G09G 5/00 | (2006.01) |
| G09G 5/02 | (2006.01) |
| G06F 17/00 | (2006.01) |
| G06F 7/00 | (2006.01) |
| G06T 1/00 | (2006.01) |
| H04B 1/66 | (2006.01) |
| H04N 7/12 | (2006.01) |
| H04N 11/02 | (2006.01) |
| H04N 11/04 | (2006.01) |
| H04N 5/76 | (2006.01) |
| H04N 5/445 | (2006.01) |
| H04N 9/77 | (2006.01) |
| H04N 9/78 | (2006.01) |
| G06K 9/00 | (2006.01) |
| G06K 9/36 | (2006.01) |
| G06K 9/46 | (2006.01) |

(52) U.S. Cl. .................. 345/589; 345/87; 345/418; 345/581; 345/610; 348/231.9; 348/567; 348/663; 348/664; 348/665; 348/666; 348/667; 348/668; 348/669; 348/670; 375/240.12; 375/240.16; 375/240.25; 382/162; 382/232; 708/490

(58) Field of Classification Search .................. 345/87, 345/418, 581, 589, 610; 375/240.12, 240.16, 375/240.25; 382/162, 232; 708/490; 348/231.9, 348/567, 663–670
See application file for complete search history.

(56) References Cited

U.S. PATENT DOCUMENTS 4,689,660 A * 8/1987 Kashigi ...................... 348/717

(Continued)

FOREIGN PATENT DOCUMENTS

EP          548 586          6/1993

(Continued)

OTHER PUBLICATIONS

International Search report dated Jul. 27, 2005 (PCT/US 05/008804).

(Continued)

*Primary Examiner*—Ulka Chauhan
*Assistant Examiner*—Aaron M Guertin
(74) *Attorney, Agent, or Firm*—Wong, Cabello, Lutsch, Rutherford & Brucculeri, LLP

(57) ABSTRACT

A system which utilizes the processing capabilities of the graphics processing unit (GPU) in the graphics controller. Each frame of each video stream is decoded. After decoding the compressed image is separated into an image representing the luminance and an image representing the chroma. The chroma image is resampled as appropriate using the GPU to provide chroma values corresponding to each luminance value at the proper locations. The resampled chroma image and the luminance image are properly combined to produce a 4:4:4 image, preferably in the RGB color space, and provided to the frame buffer for final display. Each of these operations is done in real time for each frame of the video.

14 Claims, 6 Drawing Sheets

U.S. PATENT DOCUMENTS

| | | | |
|---|---|---|---|
| 4,729,011 A * | 3/1988 | McCann | 348/183 |
| 5,486,876 A * | 1/1996 | Lew et al. | 348/719 |
| 5,490,246 A | 2/1996 | Brotsky et al. | |
| 5,798,753 A * | 8/1998 | Zhou et al. | 345/603 |
| 6,006,231 A | 12/1999 | Popa | |
| 6,266,101 B1 * | 7/2001 | Suto | 348/663 |
| 6,272,558 B1 | 8/2001 | Hui et al. | |
| 6,323,916 B1 * | 11/2001 | Meguro | 348/714 |
| 6,407,746 B1 * | 6/2002 | Tanizawa | 345/649 |
| 6,717,599 B1 | 4/2004 | Olano | |
| 7,046,306 B2 * | 5/2006 | Zhai et al. | 348/666 |
| 7,064,790 B1 * | 6/2006 | Varma et al. | 348/441 |
| 2002/0118217 A1 | 8/2002 | Fujikl | |
| 2002/0154696 A1 * | 10/2002 | Tardif | 375/240.16 |
| 2002/0154700 A1 * | 10/2002 | Tardif | 375/240.25 |
| 2003/0174136 A1 | 9/2003 | Emberling et al. | |
| 2004/0085325 A1 * | 5/2004 | Wang et al. | 345/582 |
| 2004/0189875 A1 * | 9/2004 | Zhai et al. | 348/669 |
| 2004/0218677 A1 * | 11/2004 | Tardif | 375/240.16 |
| 2004/0218678 A1 * | 11/2004 | Tardif | 375/240.16 |
| 2004/0233211 A1 * | 11/2004 | Wang et al. | 345/582 |
| 2005/0063586 A1 * | 3/2005 | Munsil et al. | 382/162 |
| 2005/0069210 A1 * | 3/2005 | Tardif | 382/233 |
| 2005/0088385 A1 * | 4/2005 | Elliott et al. | 345/87 |
| 2005/0088574 A1 * | 4/2005 | Suzuki et al. | 348/663 |
| 2006/0023952 A1 * | 2/2006 | Rai et al. | 382/232 |
| 2006/0232709 A1 * | 10/2006 | Renner et al. | 348/607 |

FOREIGN PATENT DOCUMENTS

| | | |
|---|---|---|
| EP | 0 694 879 | 1/1996 |
| EP | 1 383 080 | 1/2004 |
| WO | WO 98/45815 | 1/1998 |
| WO | WO 02/09039 A | 1/2002 |

OTHER PUBLICATIONS

International Search report dated Aug. 8, 2005 (PCT/US 05/008805).
Haeberli, P. et al., "The Accumlation Buffer: Hardware Support for High-Quality Rendering," Computer Graphics, New York, NY, vol. 24, No. 4, Aug. 1, 1990, pp. 309-318.

* cited by examiner

| Geometric Position | Data Stream | Conventional Reproduction | Sampled Reproduction |
|---|---|---|---|

4:2:0

JPEG/MPEG1

$Y_{1o} \quad Y_{2o}$ $Cb_1 Cr_1 \times$ $Y_{1e} \quad Y_{2e}$ $Y_{1o} Cb_1 Y_{2o} Y_{1e} Cr_1 Y_{2e}$

MPEG2

$Y_{1o} \quad Y_{2o}$ $\times Cb_1 Cr_1$ $Y_{1e} \quad Y_{2e}$ $Y_{1o} Cb_1 Y_{2o} Y_{1e} Cr_1 Y_{2e}$

DV-PAL $Y_{1o} \quad Y_{2o}$ $Cb_1$ $Cr_1$ $Y_{1e} \quad Y_{2e}$ $Y_{1o} Cb_1 Y_{2o} Y_{1e} Cr_1 Y_{2e}$ QuickTime Operations
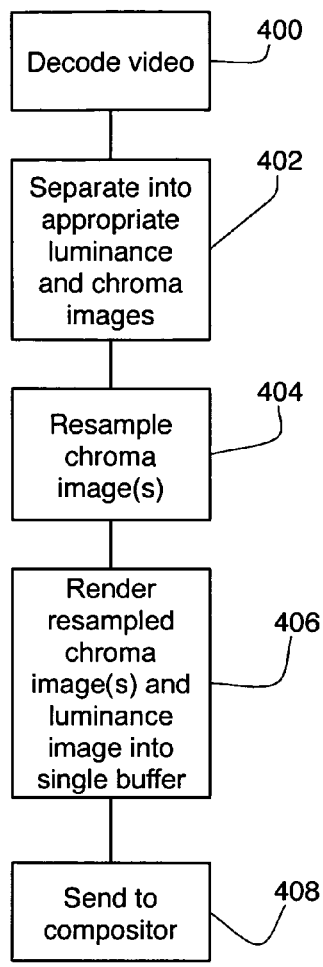
Fig. 6
Fig. 7
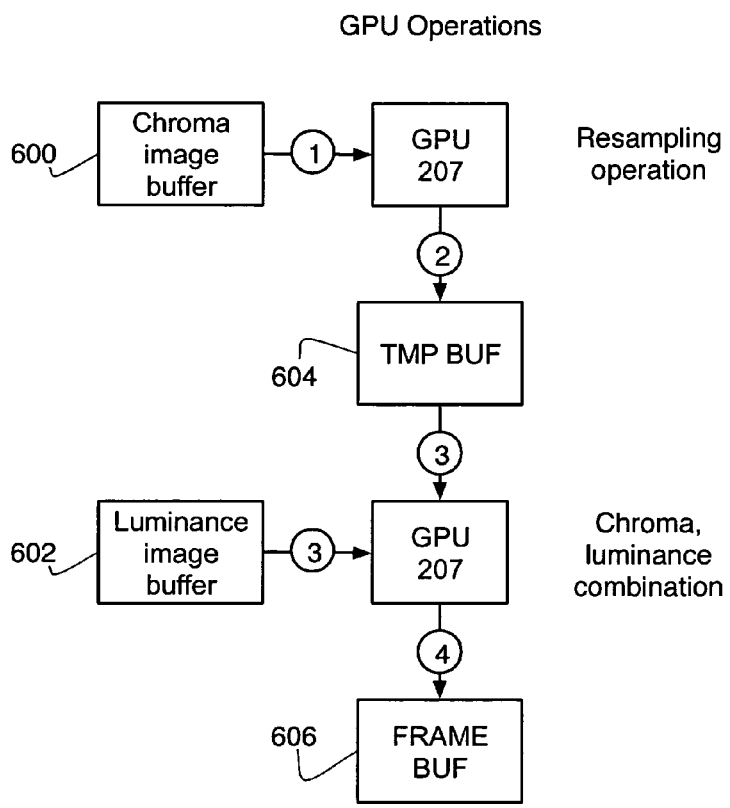

RESAMPLING CHROMA VIDEO USING A PROGRAMMABLE GRAPHICS PROCESSING UNIT TO PROVIDE IMPROVED COLOR RENDERING

RELATED APPLICATIONS

The subject matter of the invention is generally related to the following jointly owned and co-pending patent application: "Display-Wide Visual Effects for a Windowing System Using a Programmable Graphics Processing Unit" by Ralph Brunner and John Harper, Ser. No. 10/877,358, filed Jun. 25, 2004, which is incorporated herein by reference in its entirety.

BACKGROUND

The invention relates generally to computer display technology and, more particularly, to the application of visual effects using a programmable graphics processing unit during frame-buffer composition in a computer system.

Presentation of video on digital devices is becoming more common with the increases in processing power, storage capability and telecommunications speed. Programs such as QuickTime by Apple Computer, Inc., allow the display of various video formats on a computer. In operation, QuickTime must decode each frame of the video from its encoded format and then provide the decoded image to a compositor in the operating system for display.

In most video streams, while luminance values are provided for every pixel, the chroma values are subsampled so that no chroma values are provided for selected pixels, just luminance values. The most common format is 4:2:2. Y defines a luminance value while Cb and Cr define blue and red chroma values. Thus a 4:2:2 format would provide a data stream of $Y_1Cb_1Y_2Cr_1Y_3Cb_2Y_4Cr_2$. Digital video or DV is typically compressed to 4:1:1 or $Y_1Cb_1Y_2Y_3Cr_1Y_4$. Highly compressed digital video streams such as MPEG2 or H.264 use a 4:2:0 format or $Y_1Cb_1Y_2Y_3Cr_1Y_4$. Many other formats are used and can be envisioned.

Digital graphics units simply duplicate the prior chroma values into the missing or unprovided locations or samples. This effectively reduces the clarity of the reproduced image by effectively smearing the chroma information over a number of pixels, typically two or four, depending on the compression format used.

To further complicate the rendition of the video information, different formats sample both the luminance and chroma values from different locations. For example, MPEG1 uses luminance values from the four corners of a square, with the chroma value coming from the center of the square, while MPEG2 and H.264 use luminance values from the four corners but use a chroma value from the center of the left or leading edge. In further contrast, DV or 4:1:1 uses four linear luminance samples, with the chroma value from the same location as the first luminance value. The 4:2:2 format typically uses four linear luminance values, with the first and third being the locations of the chroma values. Thus the typical smearing performed by the graphics units further distorts the color rendition for the compressed video streams because of inaccuracies in reproducing the chroma values.

Because of the limited power of the CPU, it has not been possible to provide more realistic color presentation from a compressed video stream.

Thus, it would be beneficial to provide a mechanism by which compressed video can have improved chroma value application for each pixel in cases where the chroma has been subsampled.

SUMMARY

A system according to the present invention utilizes the processing capabilities of the graphics processing unit (GPU) in the graphics controller. Each frame of each video stream is decoded. After decoding the compressed image is separated into an image representing the luminance and an image representing the chroma, in the preferred embodiment. The chroma image is resampled as appropriate using the GPU to provide chroma values corresponding to each luminance value at the proper locations. The resampled chroma image and the luminance image are properly combined to produce a 4:4:4 image, preferably in the RGB color space, and provided to the frame buffer for final display. Each of these operations is done in real time for each frame of the video. Because each frame has had the chroma resampled to restore the missing samples, rather than just duplicating as previously done, the final displayed image more accurately reproduces the original color image.

BRIEF DESCRIPTION OF THE DRAWINGS

FIG. 6 shows a flowchart of operation of video software according to the present invention.

FIG. 7 shows operations and data of a graphics processing unit according to the present invention.

DETAILED DESCRIPTION

Methods and devices to provide real time video color compensation using fragment programs executing on a programmable graphics processing unit are described. The compensation can be done for multiple video streams and compensates for the subsampling of chroma used in digital video formats. The following embodiments of the invention, described in terms of the Mac OS X window server and compositing application and the QuickTime video application, are illustrative only and are not to be considered limiting in any respect. (The Mac OS X operating system and QuickTime are developed, distributed and supported by Apple Computer, Inc. of Cupertino, Calif.)

Figure 1:
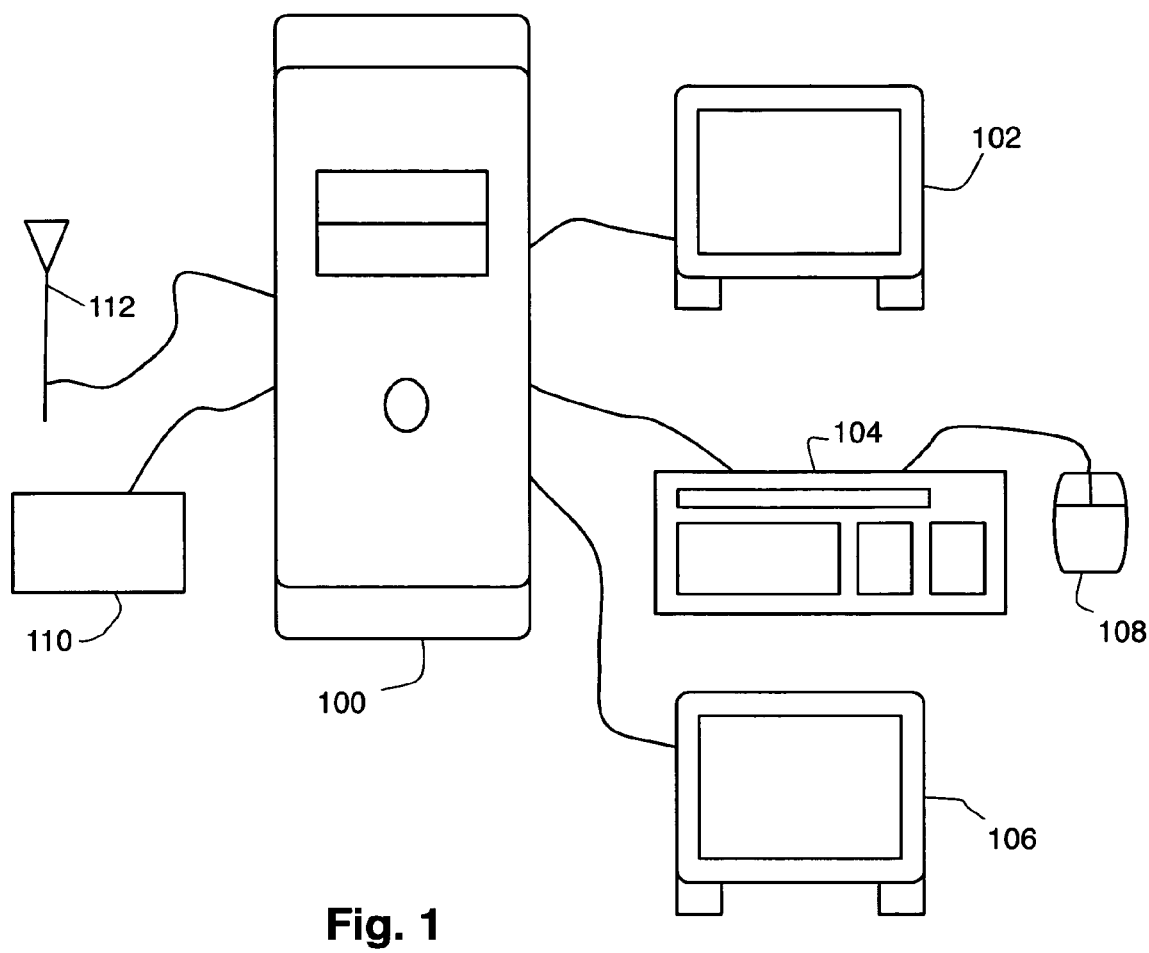
FIG. 1 shows an illustration of a computer system with various video sources and displays.

Referring now to FIG. 1, a computer system is shown. A computer 100, such as a PowerMac G5 from Apple Computer, Inc., has connected a monitor or graphics display 102 and a keyboard 104. A mouse or pointing device 108 is connected to the keyboard 104. A video display 106 is also connected for video display purposes in certain embodiments. The display 102 is more commonly used for video display, and then it is usually done in a window in the graphic display.

A video camera 110 is shown connected to the computer 100 to provide a first video source. A cable television device 112 is shown as a second video source for the computer 100.

It is understood that this is an exemplary computer system and numerous other configurations and devices can be used.

Figure 2:
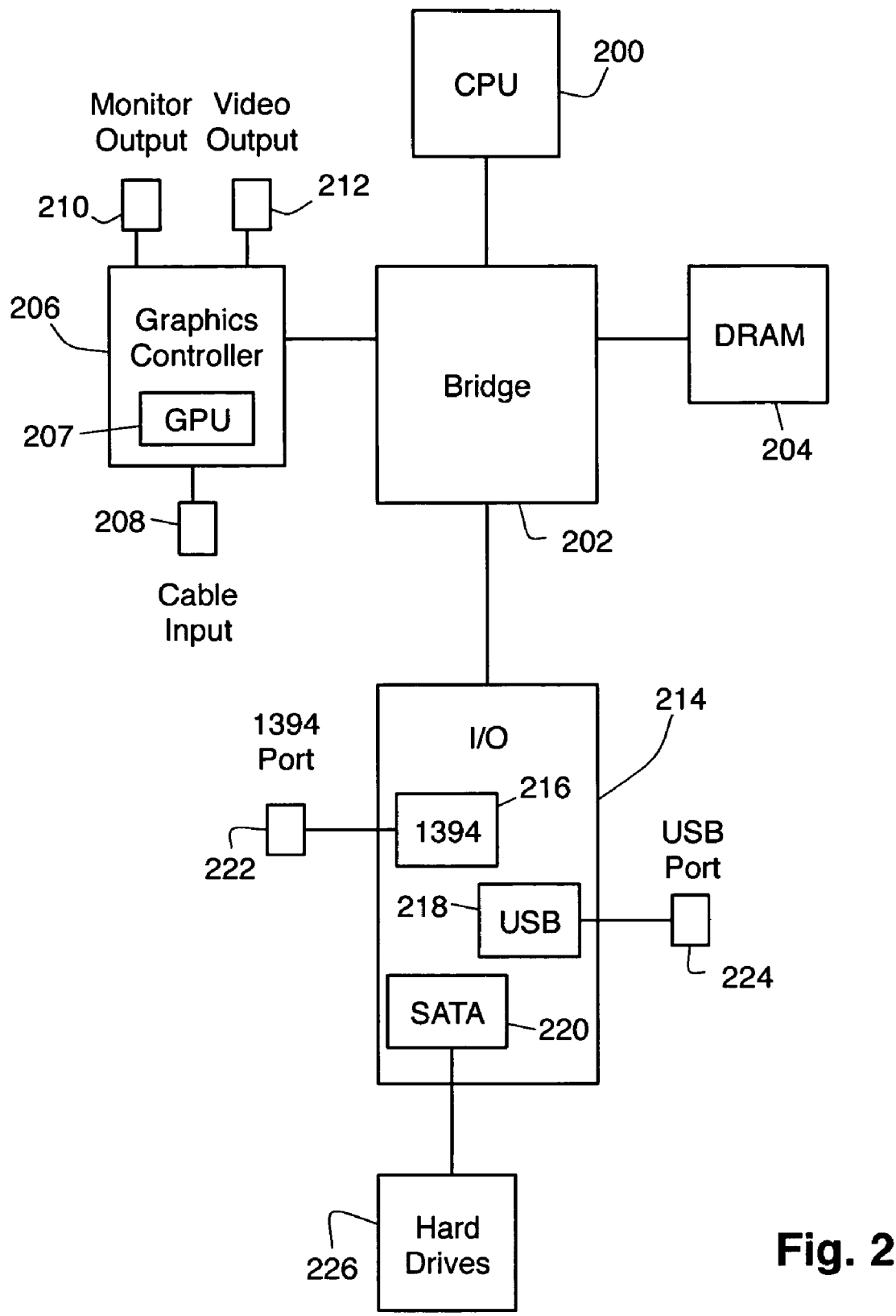
FIG. 2 shows an exemplary block diagram of the computer of FIG. 1.

Referring to FIG. 2, an exemplary block diagram of the computer 100 is shown. A CPU 200 is connected to a bridge 202. DRAM 204 is connected to the bridge 202 to form the working memory for the CPU 200. A graphics controller 206, which preferably includes a graphics processing unit (GPU) 207, is connected to the bridge 202. The graphics controller 206 is shown including a cable input 208, for connection to the cable device 112; a monitor output 210, for connection to the graphics display 102; and a video output 212, for connection to the video display 106.

An I/O chip 214 is connected to the bridge 202 and includes a 1394 or FireWire™ block 216, a USB (Universal Serial Bus) block 218 and a SATA (Serial ATA) block 220. A 1394 port 222 is connected to the 1394 block 216 to receive devices such as the video camera 110. A USB port 224 is connected to the USB block 218 to receive devices such as the keyboard 104 or various other USB devices such as hard drives or video converters. Hard drives 226 are connected to the SATA bock 220 to provide bulk storage for the computer 100.

It is understood that this is an exemplary block diagram and numerous other arrangements and components could be used.

Figure 3:
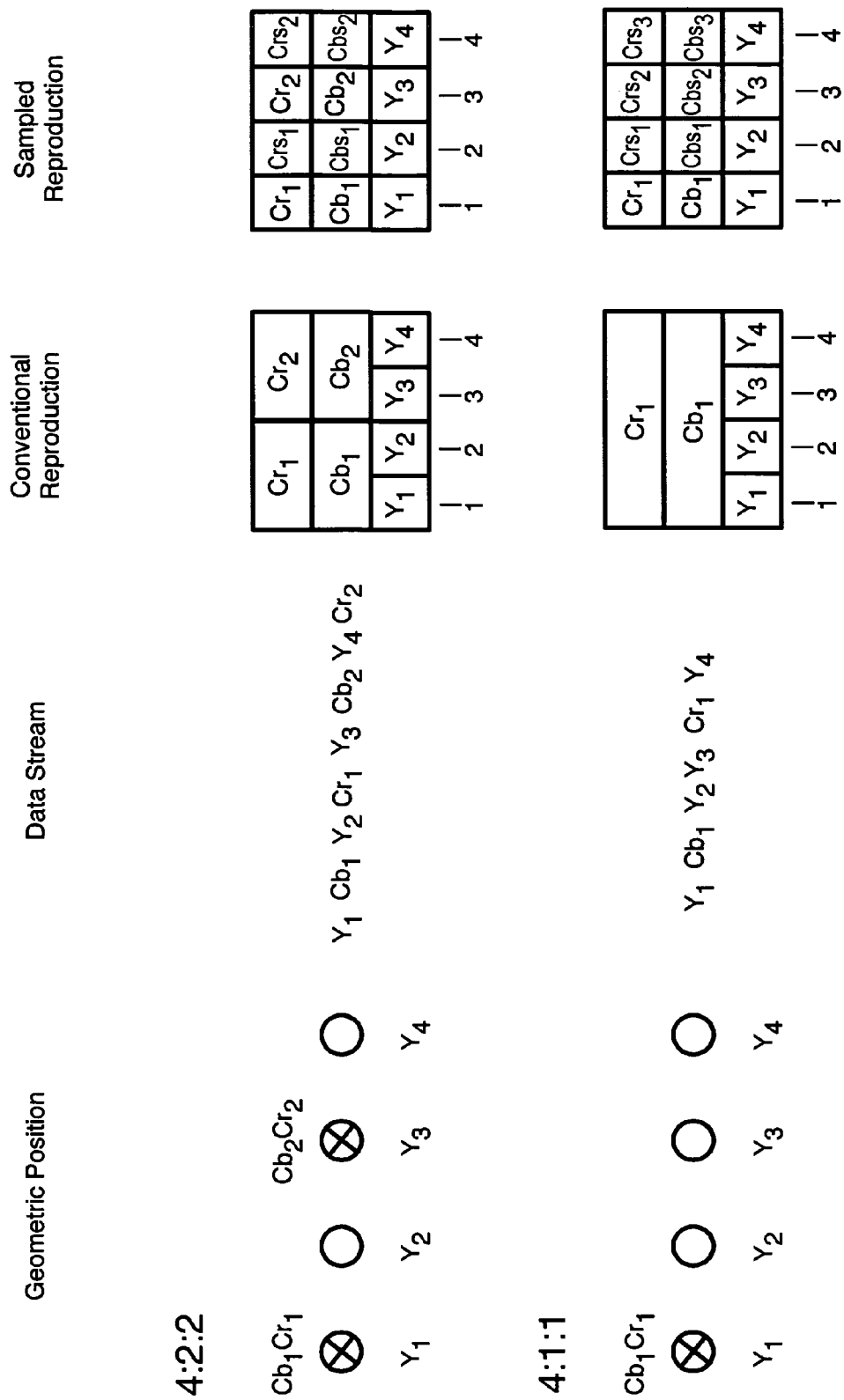
FIGS. 3 and 4 illustrate the original sampling position, digital data stream, conventional image development and resampled image development.
Figure 4:
Figure 4:
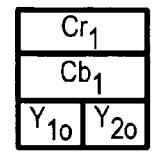
Figure 4:
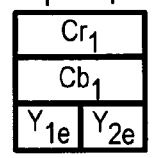
Figure 4:
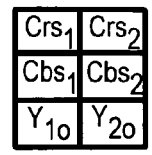
Figure 4:
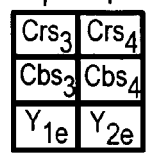
Figure 4:
Figure 4:
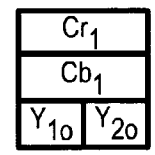
Figure 4:
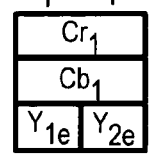
Figure 4:
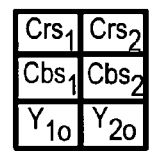
Figure 4:
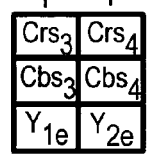
Figure 4:
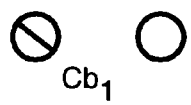
Figure 4:
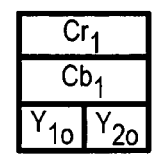
Figure 4:
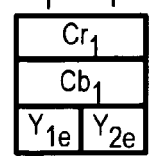
Figure 4:
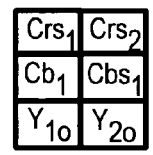
Figure 4:
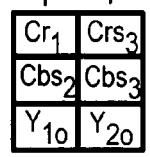

Referring then to FIGS. 3 and 4, various compressed digital video data formats are illustrated. The first column is the geometric position of the original image pixels and the sampling locations of the luminance and chroma values. The second column in the two figures is the digital data stream used by the particular encoding technique. The third column is a graphic illustrating the conventional reproduction techniques for that particular format. The final column is the results of the sampled reproduction format according to the present invention.

Referring to FIG. 3, the first indicated format is 4:2:2, the most common encoding format. As can be seen, there are four luminance samples and two sets of chroma values. In 4:2:2 the first chroma sample is co-located with the first luminance sample and the second chroma sample is co-located with the third luminance sample. The data is then provided in a data stream of first luminance value, first chroma sample first portion, second luminance value, first chroma sample second portion, third luminance value, second chroma sample first portion, fourth luminance value and finally the second chroma sample second portion. These would be conventionally reproduced with the luminance value being applied to each individual pixel, i.e., pixels 1, 2, 3 and 4, with the first chroma values applied to the first and second luminance values and the second chroma values applied to the third and fourth luminance values. In this manner the chroma values for the first pixel are smeared or duplicated to the second pixel and the second chroma values are smeared from the third pixel to the fourth pixel. As described previously, this reduces proper color rendition of the video image. In the preferred embodiment the chroma, instead of being duplicated for the missing locations, is resampled from the known good chroma values. This is shown in the fourth column where above the second and fourth pixels, i.e., the second and fourth luminance values are entries, $Cbs_1$ and $Crs_1$ for the first sampled chroma value and are $Cbs_2$ and $Crs_2$ or second sampled chroma values.

The sampled chroma values can be obtained in any number of different ways. In the simplest format a linear sampling or conversion can be done. For 4:2:2 this first sampling is from the first actual chroma value to the second actual chroma value for the second pixel location, effectively the average of the two values. For the fourth pixel location the sampling is done from the third pixel chroma values to the first pixel chroma values of the next sample set. In more preferred embodiments more complicated sampling algorithms are used, the most common of which is the sinc function which is $$\begin{cases} \frac{\sin(x)}{x} : x \neq 0 \\ 1 : x = 0. \end{cases}$$

Numerous other sampling algorithms can be utilized if desired. In the preferred embodiment the resampling is performed using a fragment program in the GPU. Fragment programming is described in more detail in Ser. No. 10/877,358 referenced above.

In the second example the 4:1:1 encoding format is illustrated in the bottom half of FIG. 3. Here only one chroma value is utilized for four pixel or luminance values and it is co-located with the first luminance value. As indicated, the conventional reproduction techniques then smear or duplicate these particular values across all four pixels. In contrast, the method according to the present invention resamples or develops new chroma values for each of the three luminance values not having a chroma value. Thus there are $Cbs_1$ to $Cbs_3$ and $Crs_1$ to $Crs_3$ for the first, second and third sampled chroma values. As above, this could be a simple linear interpolation sampling technique or could be a more sophisticated sampling technique.

Proceeding to FIG. 4, the three most common formats of 4:2:0 are shown. This is an interlaced format and the three primary variations are presented. The first variation is based on JPEG or MPEG1 encoding, while the second is MPEG2 and H.264 encoding, and the third is DV-PAL encoding. While the data streams for these three particular encoding techniques are the same for this format, it is noted that the actual sampling locations are different. For the MPEG1 format, the chroma values are sampled at the center of the four pixels, the center of the four luminance values. The single chroma values are then applied to all four relevant pixels using the appropriate luminance values as shown in the column for conventional reproduction. Again in contrast, according to the present invention resampling of the chroma values is utilized. In this example a slightly more complicated resampling algorithm must be used to properly locate a chroma value in the same physical location as the location of the luminance values. Thus, chroma values from neighboring groups of pixels must be utilized in the resampling technique.

The MPEG2 format is slightly different in that the chroma sampling is done between the even and odd first luminance samples. However, the data stream is the same and a conventional reproduction will produce exactly the same image. In this case, according to the preferred embodiment of the invention, the resampling will be slightly different than the resampling which occurred for the MPEG1 format because of different physical location of the original sampling as compared between the two samples or format, but the techniques would be similar.

Referring then to DV-PAL, the third format, it is noted that the first chroma portion is co-located with the first odd luminance value and the second chroma portion is co-located with the first even luminance value. While again the data stream is identical and conventional reproduction will produce the same use of the values, a slightly different format is used according to the present invention. In this case because the first portion or blue chroma value is co-located with the first luminance odd value, it can be directly assigned in the resampling operation. Similarly, the second portion or red chroma value, being co-located originally with the first luminance even value can be directly applied for reproducing that pixel.

Then the other three chroma values must be obtained from resampling, again using a slightly different geometric algorithm than that used for MPEG1 and MPEG2.

Thus it can be readily seen in FIGS. 3 and 4 that resampling the chroma values instead of merely duplicating them provides improved color rendition or reproduction.

Figure 5:
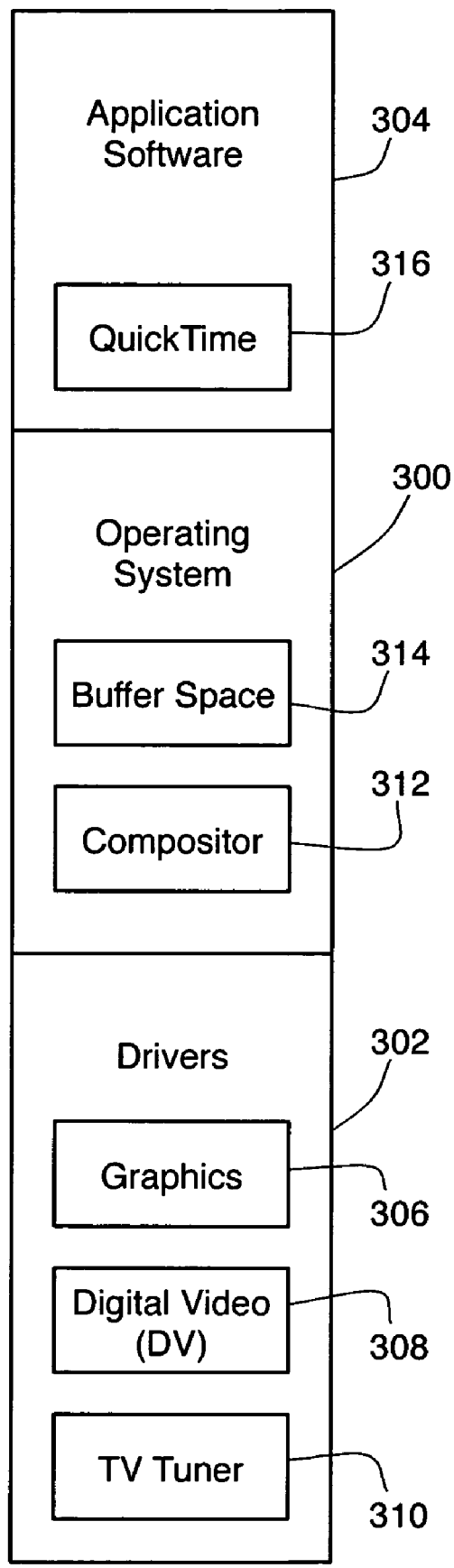
FIG. 5 shows an exemplary software environment of the computer of FIG. 1.

Referring them to FIG. 5, a drawing of exemplary software present on the computer 100 is shown. An operating system, such as Mac OS X by Apple Computer, Inc., forms the core piece of software. Various device drivers 302 sit below the operating system 300 and provide interface to the various physical devices. Application software 304 runs on the operating system 300.

Exemplary drivers are a graphics driver 306 used with the graphics controller 206, a digital video (DV) driver 308 used with the video camera 110 to decode digital video, and a TV tuner driver 310 to work with the graphics controller 206 to control the tuner functions.

Particularly relevant to the present invention are two modules in the operating system 300, specifically the compositor 312 and buffer space 314. The compositor 312 has the responsibility of receiving the content from each application for that application's window and combining the content into the final displayed image. The buffer space 314 is used by the applications 304 and the compositor 312 to provide the content and develop the final image.

The exemplary application is QuickTime 316, a video player program in its simplest form. QuickTime can play video from numerous sources, including the cable, video camera and stored video files.

Having set this background, and referring then to FIG. 6, the operations of the QuickTime application 316 are illustrated. In step 400 the QuickTime application 316 decodes the video. Further, the video can come from real time sources or from a stored or streaming video file. After the QuickTime application 316 decodes the video in step 402, the video is separated into luminance and chroma images. In the preferred embodiment the luminance values are provided to a grayscale image and the chroma values are provided to a grayscale image with opacity characteristics. One chroma value is provided to the luminance or grayness portion of the image and the other chroma value is provided to the opacity portion. In step 404 the chroma image is resampled as described above by using fragment programs on the GPU to provide chroma values for each luminance value and having a sampling location corresponding to the luminance value location. In step 406 the resampled chroma image and the luminance image are rendered into a single buffer by another fragment program on the GPU. This single buffer is preferably a 4:4:4 equivalent buffer, such as a buffer containing an RGB working color space image, to simplify compositing operations. Effectively this rendering operation is a color space conversion from 4:4:4 YCbCr to RGB or the like. In step 408 this buffer is provided to the compositor. It is also understood that these steps are performed for each frame in the video. It is noted that because these steps are performed for each frame, the color spaces can also be changed with each frame, if desired.

Referring then to FIG. 7, an illustration of the various data sources and operations of the GPU 207 are shown. A chroma image buffer 600 is provided to the GPU 207 in operation ①. Then in operation ② the GPU 207 re-samples the chroma image buffer using the proper resampling fragment program and renders the chroma image buffer into a TMP or temporary buffer 604. Any use of temporary buffers in the resampling process is omitted in FIG. 7 for clarity. The luminance image buffer 602 and the TMP buffer 604 are provided in operation ③ to the GPU 207. In operation ④ the GPU 207 combines the luminance image buffer 602 and the resampled chroma image values in the TMP buffer 604 to the frame buffer 606.

The various buffers can be located in either the DRAM 204 or in memory contained on the graphics controller 206, though the frame buffer is almost always contained on the graphics controller for performance reasons.

Thus an efficient method of performing chroma resampling from video source to final display device has been described. Use of the GPU and its fragment programs provides sufficient computational power to perform the operations in real time, as opposed to the CPU, which cannot perform the calculations in real time. Therefore, because of the resampling of the chroma values, the video is displayed with accurate colors.

Various changes in the components as well as in the details of the illustrated operational methods are possible without departing from the scope of the following claims. For instance, in the illustrative system of FIGS. 1, 2 and 3 there may be additional assembly buffers, temporary buffers, frame buffers and/or GPUs. In addition, acts in accordance with FIGS. 4, 5, and 6 may be performed by two or more cooperatively coupled GPUs and may, further, receive input from one or more system processing units (e.g., CPUs). It will further be understood that fragment programs may be organized into one or more modules and, as such, may be tangibly embodied as program code stored in any suitable storage device. Storage devices suitable for use in this manner include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices. It is further understood that the video source can be any video source, be it live or stored, and in any video format.

Further information on fragment programming on a GPU can be found in U.S. patent application Ser. Nos. 10/826,762, entitled "High-Level Program Interface for Graphics Operations," filed Apr. 16, 2004 and 10/826,596, entitled "Improved Blur Computation Algorithm," filed Apr. 16, 2004, both of which are hereby incorporated by reference.

The preceding description was presented to enable any person skilled in the art to make and use the invention as claimed and is provided in the context of the particular examples discussed above, variations of which will be readily apparent to those skilled in the art. Accordingly, the claims appended hereto are not intended to be limited by the disclosed embodiments, but are to be accorded their widest scope consistent with the principles and features disclosed herein.

What is claimed is:

1. A method for displaying digital video, comprising:
    decoding compressed digital video information having subsampled chroma values;
    separating the decoded video information into original luminance values and original chroma values;
    resampling the original chroma values to provide resampled chroma values for each original luminance value;
    providing the original luminance values to a first buffer as a first grayscale image;
    providing the resampled chroma values to a second buffer as a second grayscale image with opacity information, with one chroma value placed in the luminance portion of the second grayscale image and the other chroma value placed in the opacity portion of the second grayscale image; and combining the original luminance values in the first grayscale image and the resampled chroma values in the second grayscale image into a buffer for display.

2. The method of claim 1, wherein the resampling is performed using a linear function.

3. The method of claim 1, wherein the resampling is performed using a sinc function.

4. The method of claim 1, wherein the resampling of the decoded chroma values compensates for the location of the decoded chroma values in relation to the luminance values.

5. The method of claim 1, wherein the resampling is performed in a graphics processing unit.

6. A computer readable storage device or devices having computer-executable instructions stored therein for performing the following method for displaying digital video, the method comprising:

decoding compressed digital video information having subsampled chroma values;

separating the decoded video information into original luminance values and original chroma values;

resampling the original chroma values to provide resampled chroma values for each original luminance value;

providing the original luminance values to a first buffer as a first grayscale image;

providing the resampled chroma values to a second buffer as a second grayscale image with opacity information, with one chroma value placed in the luminance portion of the second grayscale image and the other chroma value placed in the opacity portion of the second grayscale image; and combining the original luminance values in the first grayscale image and the resampled chroma values in the second grayscale image into a buffer for display.

7. The computer readable storage device or devices of claim 6, wherein the resampling is performed using a linear function.

8. The computer readable storage device or devices of claim 6, wherein the resampling is performed using a sinc function.

9. The computer readable storage device or devices of claim 6, wherein the resampling of the decoded chroma values compensates for the location of the decoded chroma values in relation to the luminance values.

10. The computer readable storage device or devices of claim 6, wherein the resampling is performed in a graphics processing unit.

11. A computer system comprising:

a central processing unit;

memory, operatively coupled to the central processing unit, said memory adapted to provide a plurality of buffers, including a frame buffer;

a display port operatively coupled to the frame buffer and adapted to couple to a display device;

a graphics processing unit, operatively coupled to the memory; and one or more programs for causing the central processing unit or graphics processing unit to perform the following method, the method including: decoding compressed digital video information having subsampled chroma values;

separating the decoded video information into original luminance values and original chroma values;

resampling the original chroma values to provide resampled chroma values for each original luminance value;

providing the original luminance values to a first buffer as a first grayscale image;

providing the resampled chroma values to a second buffer as a second grayscale image with opacity information, with one chroma value placed in the luminance portion of the second grayscale image and the other chroma value placed in the opacity portion of the second grayscale image; and combining the original luminance values in the first grayscale image and the resampled chroma values in the second grayscale image into a buffer for display, wherein the luminance values are provided to the first buffer as a grayscale image and wherein the chroma values are provided to the second buffer as a grayscale image with opacity information, with one chroma value in the luminance portion and the other chroma value in the opacity portion.

12. The computer system of claim 11, wherein the resampling is performed using a linear function.

13. The computer system of claim 11, wherein the resampling is performed using a sinc function.

14. The computer system of claim 11, wherein the resampling of the decoded chroma values compensates for the location of the decoded chroma values in relation to the luminance values.

* * * * *

UNITED STATES PATENT AND TRADEMARK OFFICE
CERTIFICATE OF CORRECTION

PATENT NO. : 7,483,037 B2  
APPLICATION NO. : 11/261240  
DATED : January 27, 2009  
INVENTOR(S) : Sean Matthew Gies Page 1 of 1

It is certified that error appears in the above-identified patent and that said Letters Patent is hereby corrected as shown below:

On the title page item (73) Assignee:

"Apple, Inc." should be --Apple Inc.--

Signed and Sealed this

Fourteenth Day of April, 2009

JOHN DOLL  
*Acting Director of the United States Patent and Trademark Office*